United States Patent
Huang et al.

(10) Patent No.: US 11,734,183 B2
(45) Date of Patent: Aug. 22, 2023

(54) METHOD AND APPARATUS FOR CONTROLLING DATA FLOW IN STORAGE DEVICE, STORAGE DEVICE, AND STORAGE MEDIUM

(71) Applicant: Huawei Technologies Co., Ltd., Shenzhen (CN)

(72) Inventors: Yonghui Huang, Chengdu (CN); Fuquan Yang, Chengdu (CN); Wei Zeng, Chengdu (CN); Chunhua Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 17/021,385

(22) Filed: Sep. 15, 2020

(65) Prior Publication Data

US 2020/0409858 A1 Dec. 31, 2020

Related U.S. Application Data

(63) Continuation of application No. PCT/CN2019/071515, filed on Jan. 14, 2019.

(30) Foreign Application Priority Data

Mar. 16, 2018 (CN) .......................... 201810220839.4

(51) Int. Cl.
*G06F 12/08* (2016.01)
*G06F 9/30* (2018.01)
(Continued)

(52) U.S. Cl.
CPC ...... *G06F 12/0891* (2013.01); *G06F 9/30047* (2013.01); *G06F 9/5016* (2013.01);
(Continued)

(58) Field of Classification Search
CPC ............ G06F 12/0891; G06F 9/30047; G06F 9/5016; G06F 11/3037; G06F 12/0828;
(Continued)

(56) References Cited

U.S. PATENT DOCUMENTS

| 5,978,307 A | 11/1999 | Proebsting et al. |
| 8,402,226 B1 | 3/2013 | Faibish et al. |

(Continued)

FOREIGN PATENT DOCUMENTS

| CN | 1578516 A | 2/2005 |
| CN | 103200121 A | 7/2013 |

(Continued)

OTHER PUBLICATIONS

Bingtao, L., "A Dataflow Cache Processor Frontend Design," DOI:10. 7544/issn1000-1239, vol. 53, No. 6, 2016, 17 pages.

*Primary Examiner* — Masud K Khan
(74) *Attorney, Agent, or Firm* — Conley Rose, P.C.

(57) ABSTRACT

A method for controlling the data flow in the storage device is applied to a host, and includes obtaining a cache input and output parameter, determining whether the cache input and output parameter meets an overload condition, when the cache input and output parameter meets the overload condition, obtaining a first bandwidth value, where the first bandwidth value is less than a current flushing bandwidth value of the cache, determining a quantity of tokens based on the first bandwidth value, and controlling the data flow in the storage device.

20 Claims, 3 Drawing Sheets

(51) Int. Cl.
*G06F 9/50* (2006.01)
*G06F 11/30* (2006.01)
*G06F 12/0891* (2016.01)
*G06F 12/0817* (2016.01)
*G06F 12/0831* (2016.01)

(52) U.S. Cl.
CPC ...... *G06F 11/3037* (2013.01); *G06F 12/0828* (2013.01); *G06F 12/0831* (2013.01); *G06F 2209/508* (2013.01); *G06F 2209/5022* (2013.01)

(58) Field of Classification Search
CPC ......... G06F 12/0831; G06F 2209/5022; G06F 2209/508; G06F 3/0613; G06F 3/0656; G06F 3/0659; G06F 3/0683; G06F 2212/1016; G06F 2212/312; G06F 2212/7203; G06F 12/0868; G06F 3/067
See application file for complete search history.

(56) References Cited

U.S. PATENT DOCUMENTS

| | | | |
|---|---|---|---|
| 9,684,461 | B1 * | 6/2017 | Dodson ................ G06F 3/0673 |
| 2004/0267983 | A1 | 12/2004 | Oda |
| 2007/0250660 | A1 | 10/2007 | Gill et al. |
| 2014/0237136 | A1 | 8/2014 | Mutoh |
| 2016/0179427 | A1 | 6/2016 | Jen et al. |
| 2016/0291881 | A1 | 10/2016 | Li |
| 2016/0337259 | A1 | 11/2016 | Li |
| 2017/0193055 | A1 * | 7/2017 | Harn ..................... G06F 11/348 |
| 2020/0229040 | A1 | 7/2020 | Sun et al. |

FOREIGN PATENT DOCUMENTS

| | | |
|---|---|---|
| CN | 103763208 A | 4/2014 |
| CN | 104301248 A | 1/2015 |
| CN | 104407986 A | 3/2015 |
| CN | 104679442 A | 6/2015 |
| CN | 105677236 A | 6/2016 |
| CN | 105718390 A | 6/2016 |
| CN | 105763478 A | 7/2016 |
| CN | 106371916 A | 2/2017 |
| CN | 106557430 A | 4/2017 |
| CN | 107608911 A | 1/2018 |
| CN | 107800644 A | 3/2018 |
| EP | 2434702 A1 | 3/2012 |
| EP | 2790360 A1 | 10/2014 |
| EP | 2988222 A1 | 2/2016 |
| KR | 20100048492 A | 5/2010 |

* cited by examiner

METHOD AND APPARATUS FOR CONTROLLING DATA FLOW IN STORAGE DEVICE, STORAGE DEVICE, AND STORAGE MEDIUM

CROSS-REFERENCE TO RELATED APPLICATIONS

This application is a continuation of International Patent Application No. PCT/CN2019/071515 filed on Jan. 14, 2019, which claims priority to Chinese Patent Application No. 201810220839.4 filed on Mar. 16, 2018, both of which are hereby incorporated by reference in their entireties.

TECHNICAL FIELD

The present disclosure relates to the field of network communications technologies, and in particular, to a method and an apparatus for controlling a data flow in a storage device, a storage device, and a storage medium.

BACKGROUND

A storage device includes a cache and a plurality of hard disks, and the plurality of hard disks form a storage pool. When receiving a write request, the storage device first stores data in the cache, and then flushes the data in the cache to the storage pool. However, a processing capability of the storage device is limited. When an amount of data is relatively large, the processing capability of the storage device may be less than a capability of the storage device to receive data. The large amount of data usually preempts cache resources. However, a cache capacity is limited. If the cache is full, data cannot be written into the storage device. Therefore, the storage device is overloaded, and performance of the storage device deteriorates.

SUMMARY

This application provides a method and an apparatus for controlling a data flow in a storage device, a storage device, and a storage medium, to alleviate an overloaded state of a cache in the storage device and improve performance of the storage device.

According to a first aspect, this application provides a method for controlling a data flow in a storage device, including obtaining a cache input and output parameter, where the cache input and output parameter includes a cache water mark, and the cache water mark is used to indicate a proportion of an amount of data stored in a cache to a cache capacity, determining whether the cache input and output parameter meets an overload condition, where the overload condition includes that the cache water mark is higher than a first water mark threshold, when the cache input and output parameter meets the overload condition, obtaining a first bandwidth value, where the first bandwidth value is less than a current flushing bandwidth value of the cache, determining a quantity of tokens based on the first bandwidth value, and controlling the data flow in the storage device using the quantity of tokens.

The cache input and output parameter of the cache in the storage device is monitored, and whether the cache in the storage device is in an overloaded state is determined based on whether the cache input and output parameter meets the overload condition. When the cache in the storage device is in the overloaded state, the first bandwidth value that is associated with the quantity of tokens is adjusted such that the first bandwidth value is less than the current flushing bandwidth value of the cache. The data flow in the storage device is controlled based on the quantity of tokens corresponding to the first bandwidth value that is less than the current flushing bandwidth value of the cache such that an amount of data cached in the storage device is reduced. In other words, incoming traffic of the cache in the storage device is reduced. This reduces the cache water mark, alleviates the overload until the overloaded state of the cache in the storage device is eliminated, and improves performance of the storage device.

In some embodiments of the first aspect, the cache input and output parameter further includes a cache flushing concurrent usage proportion, and the overload condition further includes that the cache flushing concurrent usage proportion is greater than a target proportion threshold.

If the cache water mark is higher than the first water mark threshold, and the cache flushing concurrent usage proportion is higher than the target proportion threshold, the storage device has a sufficient data processing capability, but a remaining cache capacity is still insufficient. Based on the cache water mark and the cache flushing concurrent usage proportion, the overloaded state of the cache in the storage device can be accurately identified.

In some embodiments of the first aspect, after the controlling the data flow in the storage device using the quantity of tokens, the method further includes determining whether the cache water mark is lower than a second water mark threshold, where the second water mark threshold is lower than the first water mark threshold, when the cache water mark is lower than the second water mark threshold, obtaining a second bandwidth value, where the second bandwidth value is less than the flushing bandwidth value, and the second bandwidth value is greater than the first bandwidth value, determining a quantity of tokens based on the second bandwidth value, and controlling the data flow in the storage device using the quantity of tokens corresponding to the second bandwidth value.

If the cache water mark is lower than the second water mark threshold, it indicates that the cache of the storage device is in a stage of transition from the overloaded state to a non-overloaded state. This achieves stable data flow control. In this stage, the first bandwidth value is slightly increased to obtain the second bandwidth value that is greater than the first bandwidth value and that is less than the current flushing bandwidth value. The data flow in the storage device is controlled using the quantity of tokens corresponding to the second bandwidth value, to keep incoming traffic of the cache in the storage device stable, prevent the cache water mark from sharply decreasing, and improve stability of the storage device.

In some embodiments of the first aspect, the method for controlling the data flow in the storage device further includes obtaining a target flushing concurrency value, where the target flushing concurrency value is obtained based on a current cache water mark, the second water mark threshold, and a maximum available flushing concurrency value of the storage device, and adjusting a current flushing concurrency value to the target flushing concurrency value.

The flushing concurrency value of the cache is adjusted, to adjust a flushing bandwidth such that a change trend of the flushing bandwidth is that the flushing bandwidth value is equal to the incoming traffic of the cache in the storage device. This improves stability of the cache water mark of the cache, and further improves stability of the storage device.

According to a second aspect, this application provides an apparatus for controlling a data flow in a storage device, including a parameter obtaining module configured to obtain a cache input and output parameter, where the cache input and output parameter includes a cache water mark, and the cache water mark is used to indicate a proportion of an amount of data stored in a cache to a cache capacity, a determining module configured to determine whether the cache input and output parameter meets an overload condition, where the overload condition includes that the cache water mark is higher than a first water mark threshold, a target parameter obtaining module configured to obtain a first bandwidth value when the cache input and output parameter meets the overload condition, where the first bandwidth value is less than a current flushing bandwidth value of the cache, and a processing module configured to determine a quantity of tokens based on the first bandwidth value, and control the data flow in the storage device using the quantity of tokens.

In some embodiments of the second aspect, the cache input and output parameter further includes a cache flushing concurrent usage proportion, and the overload condition further includes that the cache flushing concurrent usage proportion is greater than a target proportion threshold.

In some embodiments of the second aspect, the determining module is further configured to determine whether the cache water mark is lower than a second water mark threshold, where the second water mark threshold is lower than the first water mark threshold, the target parameter obtaining module is further configured to obtain a second bandwidth value when the cache water mark is lower than the second water mark threshold, where the second bandwidth value is less than the flushing bandwidth value, and the second bandwidth value is greater than the first bandwidth value, and the processing module is further configured to determine a quantity of tokens based on the second bandwidth value, and control the data flow in the storage device using the quantity of tokens corresponding to the second bandwidth value.

In some embodiments of the second aspect, the target parameter obtaining module is further configured to obtain a target flushing concurrency value, where the target flushing concurrency value is obtained based on a current cache water mark, the second water mark threshold, and a maximum available flushing concurrency value of the storage device, and the processing module is further configured to adjust a current flushing concurrency value to the target flushing concurrency value.

The apparatus for controlling the data flow in the storage device may achieve a technical effect the same as that of the method for controlling the data flow in the storage device in the foregoing technical solution.

According to a third aspect, this application provides a storage device, including a memory, a processor, and a program that is stored in the memory and that can run on the processor. When executing the program, the processor implements the method for controlling the data flow in the storage device in the foregoing technical solutions, to achieve a technical effect the same as that of the method for controlling the data flow in the storage device in the foregoing technical solution.

According to a fourth aspect, this application provides a storage medium, where a program is stored in the storage medium, and when executing the program, a processor implements the method for controlling the data flow in the storage device in the foregoing technical solutions, to achieve a technical effect the same as that of the method for controlling the data flow in the storage device in the foregoing technical solution.

DESCRIPTION OF EMBODIMENTS

Figure 1:
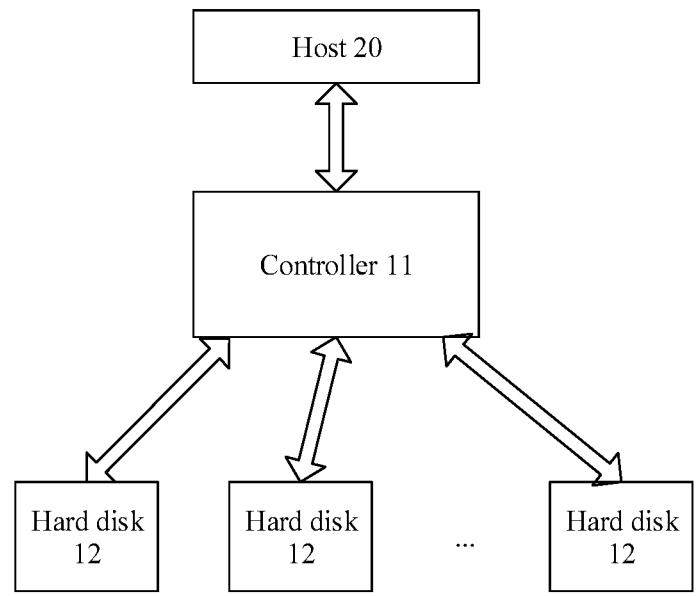
FIG. 1 is a schematic diagram of an application scenario of controlling a data flow in a storage device according to an embodiment of the present disclosure.

Embodiments of the present disclosure provide a method and an apparatus for controlling a data flow in a storage device, a storage device, and a storage medium, which may be applied to the storage device. FIG. 1 is a schematic diagram of an application scenario of controlling a data flow in a storage device according to an embodiment of the present disclosure. As shown in FIG. 1, a storage system (which may also be considered as the storage device) shown in FIG. 1 includes at least one controller 11 (the controller 11 shown in FIG. 1) and a plurality of hard disks 12. The controller 11 may be connected to a host 20 using a storage area network (SAN). The controller 11 may be a computing device such as a server and a desktop computer. An operating system and an application program are installed on the controller 11. The controller 11 may receive an input/output (I/O) request from the host 20. The controller 11 may further store data carried in the I/O request (if there is the data carried in the I/O request), and write the data into the hard disk 12 such that the data written into the storage system is persistent.

The hard disk 12 may be a hard disk drive (HDD), a solid-state drive (SSD), or the like. The SSD may be a memory that uses a flash memory chip as a storage medium, and is also referred to as an SSD. The SSD may also be a memory that uses a dynamic random-access memory (DRAM) as the storage medium. The plurality of hard disks 12 may form a storage pool. Types of the plurality of hard disks 12 in the storage pool may be different.

Figure 2:
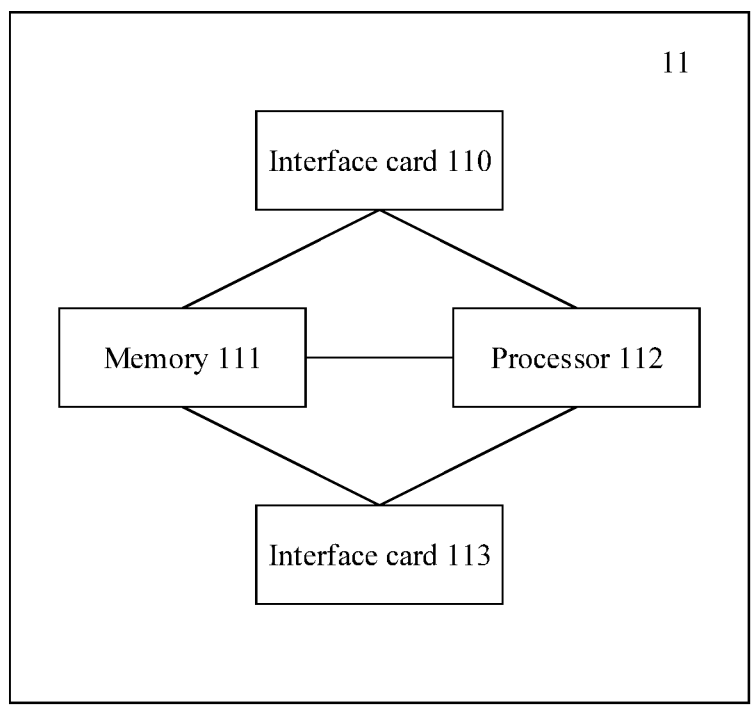
FIG. 2 is a schematic structural diagram of a controller 11 in FIG. 1.

FIG. 2 is a schematic structural diagram of the controller 11 in FIG. 1. As shown in FIG. 2, the controller 11 includes an interface card 110, a processor 112, and an interface card 113.

The interface card 110 is configured to communicate with the host, and the controller 11 may receive an operation instruction of the host 20 using the interface card 110. The processor 112 may be a central processing unit (CPU). In this embodiment of the present disclosure, the processor 112 may be configured to receive an I/O request from the host 20 and process the I/O request. The I/O request may be a data write request or a data read request. The processor 112 may further send data in the data write request to a hard disk 12.

The controller 11 may further include a memory 111, and the memory 111 is a cache. The memory 111 is configured to temporarily store data received from the host 20 or data read from the hard disk 12. When receiving a plurality of data write requests sent by the host, the controller 11 may temporarily store data that is in the plurality of data write requests in the memory 111. When a capacity of the memory 111 reaches a specific threshold, the data stored in the memory 111 and logical addresses allocated to the data are sent to the hard disk 12. The hard disk 12 stores the data. The memory 111 includes a volatile memory, a non-volatile memory, or a combination thereof. The volatile memory is, for example, a random-access memory (RAM). The non-volatile memory is, for example, any machine readable medium that can store program code, such as a floppy disk, a hard disk, a SSD, or an optical disc. The memory 111 has a power-failure protection function. The power-failure protection function means that the data stored in the memory 111 is not lost even when a system is powered on again after a power failure.

The interface card 113 is configured to communicate with the hard disk 12. The controller 11 may send, using the interface card 113, the data write request (including the data and the logical address allocated by the controller 11 to the data) to the hard disk 12 for storage.

The hard disk 12 includes a hard disk controller and a storage medium. The hard disk controller is configured to perform an operation, for example, performing the data write request or the data read request sent by the controller 11.

The cache is a buffer for data exchange. Because a running speed of the cache is much faster than that of the hard disk, to accelerate a data read/write speed, when the data is written into the cache, the cache may return write success information to the host 20, to accelerate a processing speed of the write request. The cache may aggregate the data and write the data into the hard disk 12 in the storage pool. In this embodiment of the present disclosure, an overloaded state of the cache may be used to represent an overloaded state of the storage system, to monitor the cache input and output parameter of the storage device, determine a storage status of the cache in the current storage device based on the cache input and output parameter, and adjust a data flow in the storage device based on the storage status.

The cache input and output parameter may represent an I/O state of the cache in the storage device, and a storage status of the cache in the storage device may be obtained based on the cache input and output parameter. For example, the cache input and output parameter may include one or more of parameters such as a cache water mark, flushing concurrency, and a flushing bandwidth. The cache water mark is used to indicate a proportion of an amount of data stored in the cache to a cache capacity. If the cache water mark is 100%, the cache is full. If the cache is full, new data cannot be stored. The flushing concurrency is used to indicate a quantity of write requests that are cached and that are concurrently delivered to the storage pool. Flushing bandwidth is used to indicate a flushing speed, in other words, an amount of data written into the storage pool per unit time. In the foregoing description, flushing refers to writing the data in the cache into the hard disk in the storage pool.

Figure 3A:
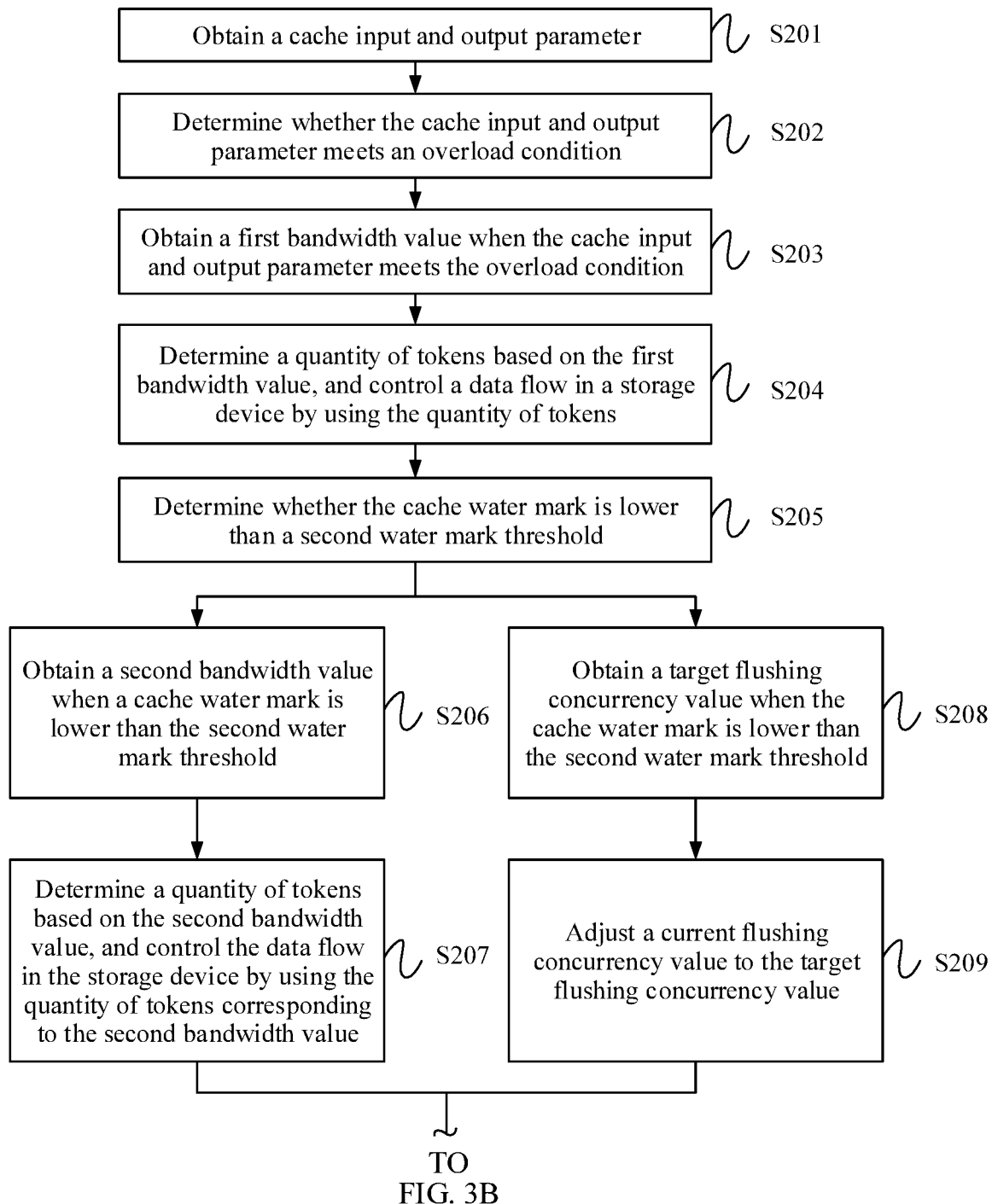
FIG. 3A and FIG. 3B are a flowchart of a method for controlling a data flow in a storage device according to an embodiment of the present disclosure.
Figure 3B:
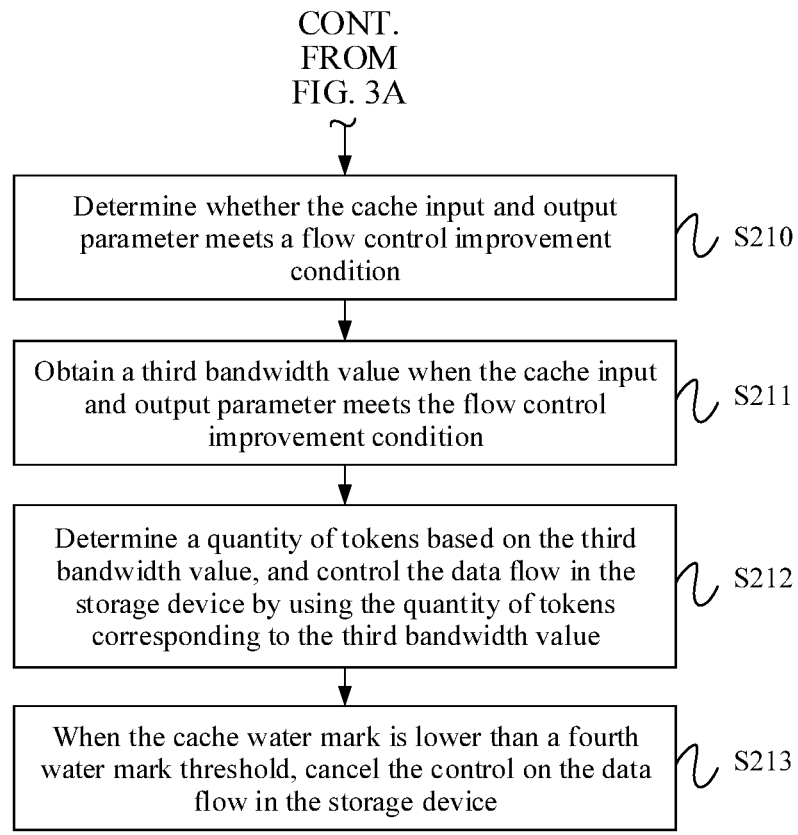

FIG. 3A and FIG. 3B are a flowchart of a method for controlling a data flow in a storage device according to an embodiment of the present disclosure. The method for controlling the data flow in the storage device may be further applied to the storage device in the storage system in the foregoing description content, and further, may be applied to the processor 112 in the foregoing description content. A program of the method for controlling the data flow in the storage device in this embodiment of the present disclosure may be stored in a controller in the storage device, or may be stored in an external memory. The external memory may access the storage device. The processor 112 of the storage device may run the program in the external memory, to implement the method for controlling the data flow in the storage device in this embodiment of the present disclosure. As shown in FIG. 3A and FIG. 3B, the flowchart of the method for controlling the data flow in the storage device may include a step S201 to a step S213.

Step S201. Obtain a cache input and output parameter.

In an example, the cache input and output parameter includes a cache water mark. In another example, the cache input and output parameter may further include a cache flushing concurrent usage proportion. The cache flushing concurrent usage proportion indicates a proportion of flushing concurrency that is currently used by a cache in a storage device to maximum flushing concurrency that can be used by the cache in the storage device. In a process of obtaining the cache input and output parameter, a query period may be set, and the cache input and output parameter is periodically collected based on the query period. To improve accuracy of the obtained cache input and output parameters, an average value of the cache input and output parameters collected in the query period may be calculated, and the average value is used as a value that is of a cache input and output parameter used in subsequent steps corresponding to the query period. For example, if the query period is 5 seconds, an average value of cache water marks collected within the 5 seconds is used as the value of the cache input and output parameter used in the subsequent steps. The cache input and output parameters collected in each query period may be further filtered, to filter out an abnormal parameter in the obtained cache input and output parameters. The abnormal parameter is a parameter that suddenly changes and that is in the collected cache input and output parameters. The value of the abnormal parameter is not an actual value of the cache input and output parameter, but an error value caused by an external impact or another reason. The abnormal parameter is filtered out to make the obtained cache input and output parameters more accurate, to more accurately control the data flow in the storage device.

Step S202. Determine whether the cache input and output parameter meets an overload condition.

When the cache input and output parameter includes the cache water mark, the overload condition includes that the cache water mark is higher than a first water mark threshold. The cache water mark is higher than the first water mark threshold, in other words, the cache input and output parameter meets the overload condition. The first water mark threshold is a cache water mark threshold for determining whether the cache is overloaded, and may be set based on a working requirement and a working scenario. This is not limited herein. For example, the first water mark threshold may be 80%. If the cache water mark is higher than the first water mark threshold, it indicates that a remaining capacity of the cache is insufficient.

When the cache input and output parameter include the cache water mark and the cache flushing concurrent usage proportion, the overload condition includes that the cache water mark is higher than a first water mark threshold and the cache flushing concurrent usage proportion is greater than a target proportion threshold. If the cache water mark is higher than the first water mark threshold and the cache flushing concurrent usage proportion is greater than the target proportion threshold, the cache input and output parameter meets the overload condition. The target proportion threshold is a cache flushing concurrent usage proportion that helps determine whether the cache is overloaded, and may be set based on a working requirement and a working scenario. This is not limited herein. For example, the target proportion threshold may be 99%. A larger cache flushing concurrent usage proportion indicates larger flushing strength of the cache in the storage device, in other words, a larger processing capability of the storage device. If the cache water mark is higher than the first water mark threshold, and the cache flushing concurrent usage proportion is higher than the target proportion threshold, the storage device has a sufficient data processing capability, but a remaining cache capacity is still insufficient. Based on the cache water mark and the cache flushing concurrent usage proportion, the overloaded state of the cache in the storage device can be accurately identified.

In an example, to further more accurately identify various states of the cache in the storage device, whether the cache input and output parameter meets the overload condition may be determined in N consecutive query periods. N is a positive integer greater than or equal to 2. If the cache input and output parameter meets the overload condition in the N consecutive query periods, a first bandwidth value is obtained, the data flow in the storage device is controlled based on a quantity of tokens corresponding to the first bandwidth value, and incoming traffic of the cache in the storage device may be adjusted, to avoid incorrect determining of the overloaded state caused by an abnormal parameter that is in one or more periods and that is affected by interference, and improve accuracy of identifying various states of the cache in the storage device.

Overload in the foregoing description refers to that the data processing capability of the storage device is less than an amount of data received by the storage device. Overload causes performance of the storage device to drop sharply and cause unstable performance of the storage device. Whether the cache in the storage device may cause overload is determined by comparing the cache water mark with the first water mark threshold. If the cache input and output parameter meets the overload condition, it indicates that the cache in the storage device may cause overload. If the cache input and output parameter does not meet the overload condition, it indicates that the cache in the storage device does not meet a condition that the cache in the storage device may cause overload.

Step S203. Obtain the first bandwidth value when the cache input and output parameter meets the overload condition.

Ideally, the incoming traffic of the cache is equal to an amount of data that is received by the cache and that is written by a host. Outgoing traffic of the cache is equal to an amount of data flushed from the cache to the storage pool. After receiving a write request from the host, the storage device needs to apply for a token in the storage device, and the storage device determines the quantity of received data based on the quantity of tokens. Specifically, a quality of service (QoS) service in the storage device may be used to query a bandwidth of the cache, and a quantity of tokens corresponding to the bandwidth is obtained based on the bandwidth of the cache. The quantity of tokens is used to indicate the amount of received data. Specifically, the data flow in the storage device may be adjusted by adjusting the quantity of tokens. For example, the storage device includes a front end, a QoS unit, and a cache unit. The QoS unit queries a bandwidth value from the cache unit, and the cache unit returns the queried bandwidth value to the QoS unit. The QoS unit obtains a quantity of tokens based on the queried bandwidth value, obtains tokens based on the quantity of tokens, and periodically issues the token. The front end applies to the QoS unit for the tokens, can receive an I/O data only after obtaining the tokens, and therefore can control the incoming traffic of the cache.

In an example, when the cache water mark is higher than the first water mark threshold, it indicates that the cache in the storage device meets the overload condition. In another example, when the cache water mark is higher than the first water mark threshold, and the cache flushing concurrent usage proportion is greater than the target proportion threshold, it indicates that the cache in the storage device meets the overload condition. When the cache of the storage device meets the overload condition, overload control can be quickly performed to ensure stable performance of the storage system. The cache water mark needs to be quickly controlled to a relatively low mark. Specifically, this may be implemented by reducing the incoming traffic of the cache, in other words, the obtained first bandwidth value is set to be less than a current flushing bandwidth value of the cache. Specifically, an adjustment coefficient may be set, and the first bandwidth value may be a product of the current flushing bandwidth value and the adjustment coefficient.

For example, the adjustment coefficient is 0.95, and for calculation of the first bandwidth value, refer to a formula (1)

$$\text{First bandwidth} = \text{Current flushing bandwidth} \times 0.95 \qquad (1).$$

Step S204. Determine the quantity of tokens based on the first bandwidth value, and control the data flow in the storage device using the quantity of tokens.

The cache input and output parameter of the cache in the storage device is monitored, and whether the cache in the storage device is in the overloaded state is determined based on whether the cache input and output parameter meets the overload condition. When the cache in the storage device is in the overloaded state, the first bandwidth value that is associated with the quantity of tokens is adjusted such that the first bandwidth value is less than the current flushing bandwidth value of the cache. The data flow in the storage device is controlled based on the quantity of tokens corresponding to the first bandwidth value less than the current flushing bandwidth value of the cache such that an amount of data cached in the storage device is reduced, in other words, the incoming traffic of the cache in the storage device is reduced. This reduces the cache water mark, alleviates the overload until the overloaded state of the cache in the storage device is eliminated, and improves the performance of the storage device.

Step S205. Determine whether the cache water mark is lower than a second water mark threshold.

After the step S204 is performed, the cache water mark gradually decreases. The storage device still monitors the cache input and output parameter. When the cache water mark is lower than the second water mark threshold, it indicates that a case in which the remaining capacity of the cache in the storage device is insufficient is alleviated. The second water mark threshold is lower than the first water mark threshold. The second water mark threshold may be set based on a working requirement and a working scenario. This is not limited herein. For example, the second water mark threshold may be 50%.

For obtaining of the cache water mark, refer to the foregoing description content. Details are not described herein again.

Step S206. Obtain a second bandwidth value when the cache water mark is lower than the second water mark threshold.

To ensure that the cache can maintain a stable remaining capacity, when the cache water mark is lower than the second water mark threshold, the incoming traffic of the cache in the storage device needs to be slightly increased, but the incoming traffic of the cache in the storage device still needs to be less than the flushing bandwidth. In other words, the second bandwidth value is less than the flushing bandwidth value, and the second bandwidth value is greater than the first bandwidth value. Specifically, an adjustment coefficient may be set, and the second bandwidth value may be a product of the current flushing bandwidth value and the adjustment coefficient. For example, if the adjustment coefficient corresponding to the first bandwidth value is 0.95, the adjustment coefficient corresponding to the second bandwidth value may be set to 0.99. Therefore, for calculation of the second bandwidth value, refer to a formula (2)

Second bandwidth=Current flushing bandwidth×0.99     (2).

Step S207. Determine a quantity of tokens based on the second bandwidth value, and control the data flow in the storage device using the quantity of tokens corresponding to the second bandwidth value.

For descriptions of a relationship between the second bandwidth value and the quantity of tokens and a relationship between the quantity of tokens and the data flow in the storage device, refer to related content of the relationship between the first bandwidth value and the quantity of tokens and the relationship between the quantity of tokens and the data flow in the storage device in the foregoing embodiment. Details are not described herein again.

If the cache water mark is lower than the second water mark threshold, it indicates that the cache of the storage device is in a stage of transition from the overloaded state to a non-overloaded state. This achieves stable data flow control. In this stage, the first bandwidth value is slightly increased to obtain the second bandwidth value that is greater than the first bandwidth value and that is less than the current flushing bandwidth value. The data flow in the storage device is controlled using the quantity of tokens corresponding to the second bandwidth value, to keep incoming traffic of the cache in the storage device stable, prevent the cache water mark from sharply decreasing, and improve stability of the storage device.

Step S208. Obtain a target flushing concurrency value when the cache water mark is lower than the second water mark threshold.

In some cases, performance of a storage pool may fluctuate. For example, the performance of the storage pool fluctuates when garbage collection (GC) is performed on the storage pool, or when a reconstruction task is performed on the storage pool. The fluctuation of the performance of the storage pool is directly reflected by fluctuation of the flushing bandwidth of the cache. Therefore, the cache water mark increases sharply or decreases sharply, and the stability of the storage device is reduced. After the cache water mark is lower than the second water mark threshold, the cache water mark continues to decrease. To ensure optimal cache utilization, the cache flushing concurrency can be adjusted to help the cache water mark to be in a stable range of the cache water mark. For example, the expected stable range of the cache water mark is 20% to 50%. The target flushing concurrency value may be obtained based on the current cache water mark, the second water mark threshold, and a maximum available flushing concurrency value of the storage device. For example, for calculating of the target flushing concurrency value, refer to a formula (3)

Target flushing concurrency value=(Current cache water mark/Second water mark threshold)× Maximum available flushing concurrency value of the storage device     (3).

Step S209. Adjust a current flushing concurrency value to the target flushing concurrency value.

It should be noted that a sequence of performing the step S208 and the step S209 and the step S206 and the step S207 is not limited, and the step S208 and the step S209 may be independently performed from the step S206 and the step S207.

The flushing concurrency value of the cache is adjusted, to adjust a flushing bandwidth such that a change trend of the flushing bandwidth is that the flushing bandwidth value is equal to the incoming traffic of the cache in the storage device. This improves stability of the cache water mark of the cache, and further improves stability of the storage device.

Step S210. Determine whether the cache input and output parameter meets a flow control improvement condition.

After the incoming traffic of the cache is adjusted in the foregoing steps, the data processing capability of the storage device is also adjusted. After the data processing capability of the storage device is improved, the cache water mark may continue to decrease, and the cache input and output parameter need to be continuously monitored. In an example, the cache input and output parameter includes the cache water mark. Correspondingly, the flow control improvement condition includes that the cache water mark is lower than a third water mark threshold, and the third water mark threshold is lower than the second water mark threshold. The third water mark threshold may be set based on a working requirement and a working scenario. This is not limited herein. For example, the third water mark threshold may be 20%. If the cache water mark is lower than the third water mark threshold, the cache input and output parameter meets the flow control improvement condition.

In another example, to further improve accuracy of determining whether the data processing capability of the storage device is improved, the cache input and output parameter may further include a flushing bandwidth. Correspondingly, the flow control improvement condition may further include in M consecutive query periods, a flushing bandwidth in each query period is greater than a flushing bandwidth in a previous query period. M is a positive integer greater than or equal to 2. When the cache water mark is lower than the third water mark threshold and in the M consecutive periods, the flushing bandwidth in each query period is greater than the flushing bandwidth in the previous query period, the cache input and output parameter meets the flow control improvement condition.

If the cache input and output parameter meets the flow control improvement condition, the data processing capability of the storage pool is improved. This directly reflects that the data processing capability of the storage device is also improved. To keep the cache water mark stable, the bandwidth value provided for QoS needs to be adjusted to adjust the quantity of provided tokens.

Step S211. Obtain the third bandwidth value when the cache input and output parameter meets the flow control improvement condition.

To keep the cache water mark stable when the cache water mark is relatively low, the bandwidth value needs to be increased based on the second bandwidth value, to obtain the third bandwidth value, in other words, the third bandwidth value is greater than the second bandwidth value.

Step S212. Determine a quantity of tokens based on the third bandwidth value, and control the data flow in the storage device using the quantity of tokens corresponding to the third bandwidth value.

Content of determining the quantity of tokens based on the third bandwidth value and controlling the data flow in the storage device using the quantity of tokens corresponding to the third bandwidth value is similar to content of determining the quantity of tokens based on the first bandwidth value and controlling the data flow in the storage device using the quantity of tokens. For details, refer to related descriptions of the step S204.

Step S213. When the cache water mark is lower than a fourth water mark threshold, cancel the control on the data flow in the storage device.

The fourth water mark threshold is less than the third water mark threshold. The fourth water mark threshold may be set based on a working requirement and a working scenario. This is not limited herein. The cache water mark continuously decreases, the data processing pressure of the storage device decreases, and the incoming traffic of the cache in the storage device may be less than the data processing capability of the storage device. In this case, the data flow in the storage device does not need to be specially controlled, and the control on the data flow in the storage device may be canceled.

In this embodiment of the present disclosure, the cache input and output parameter is monitored, a status of the cache in the storage device can be quickly determined, and different data flow control is implemented for different states of the cache in the storage device. Therefore, the data flow in the storage device can be quickly and stably controlled, and the incoming traffic and outgoing traffic of the cache in the storage device can be dynamically stable. This improves the working performance of the cache, and the overall working performance of the storage device.

Figure 4:
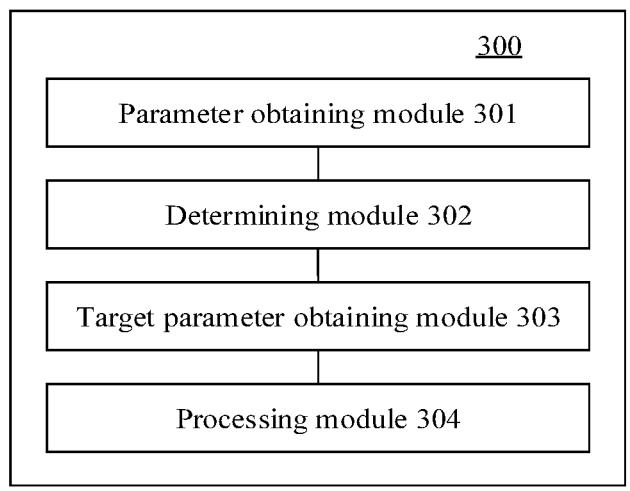
FIG. 4 is a schematic structural diagram of an apparatus for controlling a data flow in a storage device according to an embodiment of the present disclosure.

FIG. 4 is a schematic structural diagram of an apparatus 300 for controlling a data flow in a storage device according to an embodiment of the present disclosure. As shown in FIG. 4, the apparatus 300 may include a parameter obtaining module 301, a determining module 302, a target parameter obtaining module 303, and a processing module 304.

The parameter obtaining module 301 is configured to obtain a cache input and output parameter, where the cache input and output parameter includes a cache water mark, and the cache water mark is used to indicate a proportion of an amount of data stored in a cache to a cache capacity.

The determining module 302 is configured to determine whether the cache input and output parameter meets an overload condition, where the overload condition includes that a cache water mark is higher than a first water mark threshold.

The target parameter obtaining module 303 is configured to obtain a first bandwidth value when the cache input and output parameter meets the overload condition, where the first bandwidth value is less than a current flushing bandwidth value of the cache.

The processing module 304 is configured to determine a quantity of tokens based on the first bandwidth value, and control the data flow in the storage device using the quantity of tokens.

Further, the cache input and output parameter may further include a cache flushing concurrent usage proportion. Correspondingly, the overload condition may further include that the cache flushing concurrent usage proportion is greater than a target proportion threshold.

In an example, the determining module 302 is further configured to determine whether the cache water mark is lower than a second water mark threshold, where the second water mark threshold is lower than the first water mark threshold.

The target parameter obtaining module 303 is further configured to obtain a second bandwidth value when the cache water mark is lower than the second water mark threshold, where the second bandwidth value is less than the flushing bandwidth value, and the second bandwidth value is greater than the first bandwidth value.

The processing module 304 is further configured to determine a quantity of tokens based on the second bandwidth value, and control the data flow in the storage device using the quantity of tokens corresponding to the second bandwidth value.

In an example, the target parameter obtaining module 303 is further configured to obtain a target flushing concurrency value, where the target flushing concurrency value is obtained based on the current cache water mark, the second water mark threshold, and the maximum available flushing concurrency value of the storage device.

The processing module 304 is further configured to adjust a current flushing concurrency value to the target flushing concurrency value.

For specific functions and beneficial effects of the parameter obtaining module 301, the determining module 302, the target parameter obtaining module 303, the processing module 304, and the controller 11, refer to related detailed descriptions of the step S201 to the step S213 in the foregoing embodiment. Details are not described herein again.

An embodiment of the present disclosure further provides a storage medium. The storage medium stores a program. When executing a processor, the program may implement the method for controlling a data flow in a storage device in the foregoing embodiments.

The parts in this specification are all described in a progressive manner, for same or similar parts in the embodiments, refer to these embodiments, and each embodiment focuses on a difference from other embodiments. Especially, apparatus embodiments, storage device embodiments, and storage medium embodiments are basically similar to method embodiments, and therefore are described briefly. For related parts, refer to descriptions in the method embodiments.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling a data flow in a storage device, comprising:
    obtaining a cache input and output parameter comprising a cache flushing concurrent usage proportion and a cache water mark indicating a proportion of an amount of data stored in a cache to a cache capacity;
    determining whether the cache input and output parameter meets an overload condition, wherein the overload condition comprises the cache water mark being higher than a first water mark threshold;

obtaining a first bandwidth value when the cache input and output parameter meets the overload condition, wherein the first bandwidth value is less than a current flushing bandwidth value of the cache;

determining a first quantity of tokens based on the first bandwidth value; and controlling the data flow in the storage device using the first quantity of tokens.

2. The method of claim 1, wherein the overload condition further comprises the cache flushing concurrent usage proportion being greater than a target proportion threshold.

3. The method of claim 1, further comprising:

determining whether the cache water mark is lower than a second water mark threshold;

obtaining a second bandwidth value when the cache water mark is lower than the second water mark threshold;

determining a second quantity of tokens based on the second bandwidth value; and controlling the data flow in the storage device using the second quantity of tokens.

4. The method of claim 3, wherein the second water mark threshold is lower than the first water mark threshold.

5. The method of claim 3, wherein the second bandwidth value is less than the flushing bandwidth value and greater than the first bandwidth value.

6. The method of claim 3, further comprising:

obtaining a target flushing concurrency value based on a current cache water mark, the second water mark threshold, and a flushing concurrency value of the storage device; and adjusting a current flushing concurrency value to the target flushing concurrency value.

7. The method of claim 1, wherein the cache flushing concurrent usage proportion indicates a proportion of flushing concurrency that is currently used by the cache to maximum flushing concurrency that can be used by the cache.

8. A storage device, comprising:

an interface configured to communicate with a host; and a processor coupled to the interface and configured to:

obtain a cache input and output parameter comprising a cache flushing concurrent usage proportion and a cache water mark indicating a proportion of an amount of data stored in a cache to a cache capacity;

determine whether the cache input and output parameter meets an overload condition, wherein the overload condition comprises the cache water mark being higher than a first water mark threshold;

obtain a first bandwidth value when the cache input and output parameter meets the overload condition, wherein the first bandwidth value is less than a current flushing bandwidth value of the cache;

determine a first quantity of tokens based on the first bandwidth value; and control a data flow in the storage device using the first quantity of tokens.

9. The storage device of claim 8, wherein the overload condition further comprises the cache flushing concurrent usage proportion being greater than a target proportion threshold.

10. The storage device of claim 8, wherein the processor is further configured to:

determine whether the cache water mark is lower than a second water mark threshold;

obtain a second bandwidth value when the cache water mark is lower than the second water mark threshold;

determine a second quantity of tokens based on the second bandwidth value; and control the data flow in the storage device using the second quantity of tokens.

11. The storage device of claim 10, wherein the second water mark threshold is lower than the first water mark threshold, and wherein the second bandwidth value is less than the flushing bandwidth value and greater than the first bandwidth value.

12. The storage device of claim 10, wherein the processor is further configured to:

obtain a target flushing concurrency value based on a current cache water mark, the second water mark threshold, and a flushing concurrency value of the storage device; and adjust a current flushing concurrency value to the target flushing concurrency value.

13. The storage device of claim 8, wherein the cache flushing concurrent usage proportion indicates a proportion of flushing concurrency that is currently used by the cache to maximum flushing concurrency that can be used by the cache.

14. A computer program product comprising computer-executable instructions for storage on a non-transitory computer-readable medium that, when executed by a processor, cause a storage medium to:

obtain a cache input and output parameter comprising a cache flushing concurrent usage proportion and a cache water mark indicating a proportion of an amount of data stored in a cache to a cache capacity;

determine whether the cache input and output parameter meets an overload condition, wherein the overload condition comprises the cache water mark being higher than a first water mark threshold;

obtain a first bandwidth value when the cache input and output parameter meets the overload condition, wherein the first bandwidth value is less than a current flushing bandwidth value of the cache;

determine a first quantity of tokens based on the first bandwidth value; and control data flow in the storage medium using the first quantity of tokens.

15. The computer program product of claim 14, wherein the overload condition further comprises the cache flushing concurrent usage proportion being greater than a target proportion threshold.

16. The computer program product of claim 14, wherein, the computer-executable instructions further cause the storage medium to:

determine whether the cache water mark is lower than a second water mark threshold;

obtain a second bandwidth value when the cache water mark is lower than the second water mark threshold;

determining a second quantity of tokens based on the second bandwidth value; and controlling the data flow in the storage medium using the second quantity of tokens.

17. The computer program product of claim 16, wherein the second water mark threshold is lower than the first water mark threshold.

18. The computer program product of claim 16, wherein the second bandwidth value is less than the flushing bandwidth value and greater than the first bandwidth value.

19. The computer program product of claim 16, wherein the computer-executable instructions further cause the storage medium to:

obtaining a target flushing concurrency value based on a current cache water mark, the second water mark threshold, and a flushing concurrency value of the storage medium; and adjusting a current flushing concurrency value to the target flushing concurrency value.

20. The computer program product of claim 14, wherein the cache flushing concurrent usage proportion indicates a proportion of flushing concurrency that is currently used by the cache to maximum flushing concurrency that can be used by the cache.

\* \* \* \* \*